US006403231B1

(12) United States Patent
Mueller et al.

(10) Patent No.: US 6,403,231 B1
(45) Date of Patent: Jun. 11, 2002

(54) THERMOPLASTIC FILM STRUCTURES HAVING IMPROVED BARRIER AND MECHANICAL PROPERTIES

(75) Inventors: Chad Mueller, Appleton; Roger Kaas, Sherwood, both of WI (US); Bertrand Fillon, Voreppe (FR); Sandrine Tournier, Fontaine (FR); Jean-Jacques Lerda, Bilieu (FR)

(73) Assignee: Pechiney Emballage Flexible Europe (FR)

( * ) Notice: Subject to any disclaimer, the term of this patent is extended or adjusted under 35 U.S.C. 154(b) by 0 days.

(21) Appl. No.: 09/569,474

(22) Filed: May 12, 2000

(51) Int. Cl.⁷ .............................. B32B 5/16; B32B 27/00
(52) U.S. Cl. .................... 428/474.4; 428/338; 428/339; 428/451; 428/474.7; 428/476.3; 428/477.7; 428/483; 428/516
(58) Field of Search ............................... 428/474.4, 338, 428/339, 451, 476.3, 474.7, 477.7, 983, 516

(56) References Cited

U.S. PATENT DOCUMENTS

| | | | |
|---|---|---|---|
| 2,531,396 A | 11/1950 | Carter et al. | |
| 5,328,975 A | 7/1994 | Hanson et al. | 528/29 |
| 5,352,493 A | 10/1994 | Dorfman et al. | 427/530 |
| 5,385,776 A | 1/1995 | Maxfield et al. | 428/297 |
| 5,401,587 A | 3/1995 | Motohiro et al. | 428/688 |
| 5,514,734 A | 5/1996 | Maxfield et al. | 523/204 |
| 5,552,469 A | 9/1996 | Beall et al. | 524/445 |
| 5,554,670 A | 9/1996 | Giannelis et al. | 523/209 |
| 5,556,678 A | 9/1996 | Jupin et al. | 428/36.6 |
| 5,573,783 A | 11/1996 | Desieno et al. | 424/490 |
| 5,578,672 A | 11/1996 | Beall et al. | 524/446 |
| 5,604,038 A | 2/1997 | Denes et al. | 428/429 |
| 5,705,222 A | 1/1998 | Somasundaran et al. | 427/320 |
| 5,716,709 A | 2/1998 | Ferguson et al. | 428/420 |
| 5,733,644 A | 3/1998 | Tanaka et al. | 428/215 |
| 5,747,560 A | 5/1998 | Christiani et al. | 523/209 |
| 5,760,106 A | 6/1998 | Pinnavaia et al. | 523/209 |
| 5,763,101 A * | 6/1998 | Yoshimi et al. | 428/524 |
| 5,795,648 A | 8/1998 | Goel et al. | 428/336 |
| 5,801,216 A | 9/1998 | Pinnavaia et al. | 523/209 |
| 5,807,629 A | 9/1998 | Elspass et al. | 428/323 |
| 5,837,763 A | 11/1998 | Ferraro et al. | 524/449 |
| 5,844,032 A | 12/1998 | Serrano et al. | 524/445 |
| 5,858,457 A | 1/1999 | Brinker et al. | 427/162 |
| 5,866,645 A | 2/1999 | Pinnavaia et al. | 524/443 |
| 5,876,812 A | 3/1999 | Frisk et al. | 428/35.7 |
| 5,877,248 A | 3/1999 | Beall et al. | 524/450 |
| 5,880,197 A | 3/1999 | Beall et al. | 524/445 |
| 5,883,173 A | 3/1999 | Elspass et al. | 524/446 |
| 5,910,523 A | 6/1999 | Hudson | 523/213 |
| 5,916,685 A | 6/1999 | Frisk | 428/446 |
| 5,952,095 A | 9/1999 | Beall et al. | 428/332 |
| 5,958,514 A | 9/1999 | Havey et al. | 427/386 |
| 5,962,553 A | 10/1999 | Ellsworth | 523/216 |
| 5,972,448 A | 10/1999 | Frisk et al. | 428/35.7 |
| 6,117,541 A * | 9/2000 | Frisk | 428/327 |
| 6,203,923 B1 * | 3/2001 | Bansleben et al. | 428/500 |
| 6,217,962 B1 * | 4/2001 | Werth | 428/36.9 |

FOREIGN PATENT DOCUMENTS

| | | |
|---|---|---|
| EP | B1 0639145 | 9/1997 |
| JP | 01139347 A | 5/1989 |
| WO | WO 98/01346 | 1/1998 |
| WO | WO 98/10012 | 3/1998 |
| WO | WO 98/29491 | 7/1998 |
| WO | WO 98/29499 | 7/1998 |
| WO | WO 98/53000 | 11/1998 |
| WO | WO 99/02593 | 1/1999 |
| WO | WO 99/07790 | 2/1999 |
| WO | WO 99/32403 | 7/1999 |
| WO | WO 99/35185 | 7/1999 |
| WO | WO 99/35186 | 7/1999 |
| WO | WO 99/47598 | 9/1999 |
| WO | WO 99/49991 | 10/1999 |

* cited by examiner

Primary Examiner—P. Hampton-Hightower
(74) Attorney, Agent, or Firm—McDermott, Will & Emery

(57) ABSTRACT

The present invention relates to thermoplastic film structures having improved barrier and/or mechanical properties and methods for making the film structures. These improvements are achieved by incorporating into the thermoplastic film structures a polymeric nanocomposite comprising a polymer and nanosize particles of a modified clay.

13 Claims, No Drawings

THERMOPLASTIC FILM STRUCTURES HAVING IMPROVED BARRIER AND MECHANICAL PROPERTIES

The present invention relates to thermoplastic film structures having improved barrier and/or mechanical properties and methods for making the film structures. These improvements are achieved by incorporating into the thermoplastic film structures a polymeric nanocomposite comprising a polymer and nanosize particles of a modified clay.

DESCRIPTION OF THE PRIOR ART

It has been known to manufacture compositions which comprise modified clays in a polymeric base. These compositions are known as nanocomposites.

Carter, et al., U.S. Pat. No. 2,531,396 discloses a reinforced elastomer and a process for producing said elastomer which contains a modified clay. The clay of the invention includes montmorillonite, viz, sodium, potassium, lithium and other bentonites. The clay is characterized by an unbalanced crystal lattice which are believed to have negative charges neutralized by inorganic cations.

Frisk, U.S. Pat. No. 5,916,685 discloses a transparent multilayer laminate containing nanoparticulates having superior barrier properties to oxygen, water vapor and aromatic gases.

Frisk, et al., U.S. Pat. No. 5,876,812 disclose a container made of polymeric material which contain nanoparticulates to increase barrier properties.

Frisk, et al., U.S. Pat. No. 5,972,448 disclose a container made from a polymer material which has been integrated with a plurality of nanosize particles.

Serrano, et. al., U.S. Pat. No. 5,844,032 discloses the manufacturing of nanocomposites which are intercalated and combined with an EVOH matrix polymer.

Beall, et al., U.S. Pat. No. 5,952,095 disclose how to make specific intercalated nanoparticulates. The disclosure teaches nanoparticulates themselves, as well as methods of making them in addition to organic liquid compositions containing nanoparticulates.

Beall, et al., U.S. Pat. No. 5,880,197 disclose clays treated with organic molecules which when so treated intercalate the clay particles to create a matrix-like structure.

Beall, et al., U.S. Pat. No. 5,877,248 disclose a method of increasing the viscosity of an organic liquid by combining it with nanocomposite materials having specific characteristics/limitations.

Beall, et al., U.S. Pat. No. 5,578,672 disclose intercalates formed by mixing a phyllosilicate with a polymer and a liquid carrier, and extruding the mixture through a die-opening to absorb or intercalate the polymer between adjacent phyllosilicate platelets.

Christiani, et al., U.S. Pat. No. 5,747,560 disclose a process for making polymeric nanocomposite materials wherein the platelet particles have an average thickness equal to or less than about 50 Å and a maximum thickness of about 100 Å.

Maxfield, et al., U.S. Pat. No. 5,514,734 disclose a process of forming nanocomposite material comprising a polymer matrix comprising a polymeric material and dispersed particles selected from the group consisting of platelet or fibrillar particles having specific characteristics.

Maxfield, et al., U.S. Pat. No. 5,385,776 disclose a composite formed from a gamma phase polyamide having dispersed therein a particulate material such as a phyllosilicate.

Alexandre, et. al., WO 99/47598, disclose a nanocomposite which is a dispersion of nanofiller particles derived from layered metal oxides or metal oxide salts. The nanocomposite is advantageously prepared by first swelling an untreated clay in water, then removing the water to form an organophilic clay that is dispersible in non-polar organic solvents. The organophilic clay can then be treated with an alkyl aluminoxane and subsequently a catalyst to form a complex that promotes olefin or styrenic polymerization and platelet dispersion, The nanocomposite can be prepared directly by in situ polymerization of the olefin or the styrene at the nanofiller particles without shear, without an ion exchange step, and without the need to incorporate polar substituents into the polyolefin or polystyrene.

Fischer, et al., WO 99/35185 disclose a method for preparing a nanocomposite material based on a polymeric matrix and a layered double hydroxide. The disclosure further relates to a nanocomposite material obtainable by such method and to a shaped article manufactured from such nanocomposite material.

Barbee, et al., WO 99/32403 disclose a composition comprising a polymer having dispersed therein at least one layered clay material which has been cation exchanged with organic cation salts; and at least one expanding agent which is compatible with said polymer. Preferred polymers include polyesters. The compositions of the disclosure show vastly improved platelet separation as evidenced by higher than previously reported basal spacing. The disclosure further relates to polyester composite materials having improved barrier useful for forming packages that have improved gas barrier properties.

Fischer, WO 99/07790 discloses a nanocomposite material on the basis of a clay having a layered structure and a cation exchange capacity of from 30 to 250 milliequivalents per 100 grams, a polymeric matrix and a block copolymer or a graft copolymer, which block copolymer or graft copolymer comprises one or more first structural units, which are compatible with the clay, and one or more second structural units, which are compatible with the polymeric matrix. Fischer further discloses a nanocomposite material wherein the clay has a cation exchange capacity of from 50 to 200 milliequivalents per 100 gram. In addition, Fischer discloses a nanocomposite material wherein the polymeric matrix is selected from the group consisting of polyolefins, vinyl polymers, polyesters, polyethers, polysiloxanes and acrylic polymers.

Li, et al., WO 98/53000 disclose toughened nanocomposite materials which are prepared based on a blend of one or more thermoplastic engineering resins, e.g., nylon, a functionalized, e.g., brominated, copolymer of a $C_4$–$C_7$ isomonoolefin, e.g., isobutylene, and a para-alkylstyrene, e.g., para-methylstyrene, and further contain a uniformly dispersed exfoliated phyllosilicate layered clay, e.g., montmorillonite. The nanocomposite materials exhibit superior mechanical properties, including enhanced impact strength. The composition of this disclosure may be extruded, compression molded, blow molded or injection molded into various shaped articles including fibers, films, industrial parts such as automotive parts, appliance housings, consumer products, packaging and the like. The resulting articles exhibit both high impact strength and low vapor permeability.

Matayabas, et al., WO 98/29499 disclose polyester-platelet particle composite compositions comprising about 0.01 to about 25 weight percent platelet particles dispersed in at least one polyester wherein said composition has an intrinsic viscosity of greater than about 0.55 dl/g, low shear melt viscosity greater than about 30,000 poise and a gas permeability which is at least 10% lower than that of unmodified polyester.

Frisk, et. al., WO 98/01346 disclose a container which is composed of a polymer material integrated with a plurality of nanosize particles of a clay mineral which act to enhance the barrier properties of the container. The polymer material may be PET, COPET or any mixture thereof. The nanocomposite polymer container decreases the permeability of various gases without substantially altering the fabrication method for producing containers composed of PET or COPET material, and without altering the containers themselves. The nanocomposite polymer containers of the disclosure are able to accomplish this due to the minimal amount of clay integrated with the polymer material, i.e., between 0.1% and 10% weight of the container. The small amount of clay provides a substantial barrier due to the high aspect ratios of the clay particles which will vary between 100 and 2000. The nanocomposite polymer container may be produced using in situ polymerization, solution intercalation, or melt exfoliation to integrate the clay mineral with the polymer material matrix. The clay mineral may be smectite, vermiculite, halloysite or any synthetic analog thereof, with a preference for the montmorillonite species of smectite clays.

SUMMARY OF THE INVENTION

This invention relates to polymeric thermoplastic film structures having improved barrier and/or mechanical properties wherein at least one layer of the thermoplastic film structure comprises a polymeric nanocomposite comprising a polymer and nanosize particles of a modified clay, and methods of making the polymeric thermoplastic film structures.

DETAILED DESCRIPTION OF THE INVENTION

Layered clay minerals such as smectite clays which are further exemplified by montmorillonite, nontronite, beidellite, volkonskoite, hectorite, saponite, sauconite, magadite, kenyaite and vermiculite are composed of packets of face to face stacking of individual silicate layers or sheets. In nature, the metal ions are substituted for ions such as Mg, Fe, Mn and Li. Because of this substitution, the sheets have a negative charge imbalance that is neutralized by hydratable cations such as sodium and calcium. The thickness of the sheets is about 1 nm and the diameter of the sheets is typically from 50 to 1000 nm resulting in aspect ratios of 50 to 1000. These layered clay minerals are also known as phyllosilicates.

It is known that these layered clay minerals can be treated with organic molecules such as, e.g., organic ammonium ions to insert the organic molecules between adjacent planar silicate layers thereby increasing the interlayer spacing between the adjacent silicate layers. This process is known as intercalation and the resulting treated clay mineral is termed "modified clay." The thus-treated intercalated phyllosilicates have interlayer spacing of at least 10–20 Å and up to about 100 Å. The modified clay may then be used in at least two distinct methods for preparing nanocomposites, i.e., melt compounding and in situ polymerization. Both methods are known to those skilled in the art. The preferred method of melt compounding of nanocomposites is with a twin-screw extruder or similar blending apparatus. In order to achieve good intercalation, exfoliation and dispersion of the clay minerals, processing conditions should be such that both shear rate and residence time are optimized.

In addition to these methods, the clay can also be incorporated into liquid coatings or adhesives. As with melt compounding, processing conditions should be such that both shear rate and residence time are optimized. The adhesive or coating may consist of monomer, oligomer, polymer or mixtures thereof and may undergo polymerization after it has been applied to a substrate.

The amount of modified clay material combined with the polymer should be in an amount that is sufficient to provide the desired barrier and/or mechanical properties. The amount of modified clay material in the nanocomposites of the invention comprises about 0.1% to about 25% by weight of the composition. A preferred range of modified clay material comprises about 0.5% to about 10% of the composition.

Polymers suitable for use in the nanocomposites of the present invention are exemplified, but not limited to, polyolefins such as low density polyethylene (LDPE), linear low density polyethylene (LLDPE), medium density polyethylene (MDPE), high density polyethylene (HDPE), and polypropylene (PP), polyamides such as poly(m-xyleneadipamide) (MXD6), poly (hexamethylenesebacamide), poly (hexamethyleneadipamide) and poly(-caprolactam), polyesters such as poly(ethylene terephthalate), and polyacrylonitriles. Other polymers suitable for use in the nanocomposites of the invention include ethylene vinyl alcohol copolymers, ethylene vinyl acetate copolymers, polyesters grafted with maleic anhydride, PVdC, aliphatic polyketone, and LCP (liquid crystalline polymers). A polyketone is exemplified by Carillon® which is produced by Shell. A liquid crystalline polymer is exemplified by Vectra® which is produced by Ticona. Further polymers that may be used include epoxy and polyurethane adhesives.

While certain clay minerals have been exemplified above it is understood that any clay mineral (both natural and synthesized) having a cation-exchange capacity of 50 to 200 milliequivalent/100 g and a large contact area with the polymer to be used in said nanocomposite are useful in the present invention.

Definition of Terms

Unless specifically set forth and defined or otherwise limited, the following terms as used herein have the following meanings.

Adhesive shall mean substances which bind/adhere; adhesives as used herein can generally be classified either as tie resins or laminating adhesives.

Aspect Ratio shall mean the ratio of a particular object's width to its thickness.

Barrier shall mean a material or a material structure such as a film, layer, membrane or surface coating which prevents the penetration or permeation of vapors or gases through or beyond the material or material structure acting as the barrier. Such barriers may be selective or non-selective depending on whether or not the barrier acts to prevent a specific (or number of specific) vapors or gases to penetrate or permeate the barrier material or structure. Thus, a water vapor or moisture barrier would prevent penetration or permeation by water vapor, an oxygen barrier would prevent penetration by oxygen (for example, oxygen as contained in the atmosphere), and a flavor or aroma barrier would prevent penetration or permeation by complex organic molecules that impart flavor or aroma. These barriers may act to prevent penetration or permeation by vapors or gases by means of certain physical or chemical properties that the barrier material or barrier structure possesses.

Core or core layer shall mean an interior layer of a multilayer film having an odd number of layers wherein the same number of layers is present on either side of the core layer.

Epoxy shall mean a compound containing an epoxide functionality.

Ethylene vinyl acetate copolymer (EVA) shall mean a copolymer formed from ethylene and vinyl acetate monomers wherein the ethylene derived units in the copolymer are present in major amounts and the vinyl acetate derived units in the copolymer are present in minor amounts.

Ethylene vinyl alcohol copolymer (EVOH) shall mean a copolymer formed by the hydrolysis of poly(vinyl acetate).

Exfoliate or exfoliated shall mean individual platelets of a modified clay so that adjacent platelets of the modified clay can be dispersed individually throughout a carrier material, such as water, a polymer, an alcohol or glycol, or any other organic solvent.

Exfoliation shall mean a process for forming an Exfoliate from a modified clay.

Intercalant shall mean an organic molecule such as an ammonium ion that is absorbed between platelets of the layered material and complexes with the $Na^+$ cations on the platelet surfaces to form an Intercalate.

Intercalate or intercalated shall mean a Layered Material that includes organic molecules disposed between adjacent platelets of the Layered Material to increase the interlayer spacing between the adjacent platelets to at least about 5 Å, preferably at least about 10 Å.

Intercalation shall mean a process for forming an Intercalate.

Interior or interior layer shall mean a layer of a multilayer film which is not a skin or surface layer of the film.

Intermediate or intermediate layer shall mean an interior layer of a multi-layer film which is positioned between a core layer and a surface layer of said film.

Laminating adhesive shall mean an adhesive between two substrates; typically laminating adhesives are thermosetting polymers such as polyurethane or epoxy that cure after they have been applied.

Layered Material shall mean an inorganic material, such as a smectite clay mineral, that is in the form of a plurality of adjacent, bound layers and has a thickness, for each layer, of about 3 Å to about 50 Å, preferably about 10 Å.

Matrix monomer shall mean a monomer that the Intercalate or Exfoliate is mixed with or dispersed.

Matrix polymer shall mean a thermoplastic or thermosetting polymer in which the Intercalate and/or Exfoliate is mixed or dispersed to form a Nanocomposite.

Modified clay shall mean layered material that has undergone intercalation.

Nanocomposite shall mean a mixture that includes a monomer, polymer, oligomer, or copolymer having dispersed therein a plurality of individual platelets obtained from an exfoliated modified clay.

Optical properties shall mean properties including gloss, haze and clarity (all defined by Annual ASTM Book of Standards or TAPPI Test Methods)

Platelets shall mean individual layers of the Layered Material.

Polyamides shall mean a polymer with repeating amide groups (HN-CO) such as poly(hexamethylene sebacamide), poly(hexamethylene adipamide), poly(-caprolactam) and poly(m-xyleneadipamide), and a copolymer of Nylon 6 with Nylon 6,6, which are also known as Nylon-6,10, Nylon 6,6, Nylon-6, MXD6, and Nylon 6/6,6, respectively.

Polyethylene shall mean families of resins obtained by substantially polymerizing the gas ethylene. By varying the comonomers, catalyst and methods of polymerization, properties such as density, melt index, crystallinity, degree of branching, molecular weight and molecular weight distribution can be regulated over wide ranges. Polyethylenes include low density polyethylenes (LDPE); medium density polyethylenes (MDPE); and high density polyethylenes (HDPE). Comonomers which are useful in the polyethylene resin family are alpha-olefins having from 4 to 20 carbons.

Polyethylene terephthalate (PET) shall mean a polyester formed by the condensation of ethylene glycol and terephthalic acid.

Polymer or polymer resin include but are not limited to, homopolymers, copolymers, such as for example, block, graft, random and alternating copolymers, terpolymers, etc., and blends and modifications thereof. Polymer or polymer resin shall also include all possible molecular configurations of the material. These structures include but are not limited to, isotactic, syndiotactic and random molecular configurations.

Polyolefins shall mean polymers of olefins such as, for example, ethylene, propylene, butenes, isoprenes and pentenes; including but not limited to homopolymers, copolymers, blends and modifications of said olefins.

Polyurethane shall mean polymers containing a urethane bond.

Smectite is a 2:1 type layer silicate with an expandable lattice carrying an excess negative layer charge. The 2:1 ratio refers to a layered structure consisting of an octahedral metal oxide sheet sandwiched between two tetrahedral silicon oxide sheets.

Surface or surface layer or skin or skin layer shall mean a layer of a multi-layer film which comprises a surface thereof.

Tie resin or layer shall mean an adhesive comprised of thermoplastic polymer that has some affinity for materials it is meant to adhere to or bind together; typically tie resins are used in coextrusion or extrusion lamination and typically are polyolefin copolymers such as EVA, EAA or EMA, or polyolefins that are grafted with maleic anhydride (examples of grafted materials are Plexar® from Equistar and Bynel® from DuPont).

The mechanical properties of materials for plastic packaging are physical properties that relate to the response (deformation) of the material under an applied stress. Some important mechanical properties are tensile strength, stiffness (flexural modulus), compressive strength, and impact resistance (toughness). Several standard ASTM tests for measuring mechanical properties of a material are listed below.

In the packaging industry, especially, the area of flexible films having one or more polymeric layers, there is a need to improve the barrier and/or mechanical properties of these films. It has been known to blend inorganic filler materials with a polymer material in film structures in order to achieve these improved properties. However, this approach has not addressed the need completely as the inorganic filler may embrittle the structure and/or detract from its optical properties (such as haze and transparency). It has now been found that the incorporation of nanosize particles of a modified clay into one or more of the polymeric layers of said film structure can improve the barrier properties without sacrificing, and many times improving, the mechanical, optical and other properties and polymeric nature of the material.

The films of the present invention have improved barrier and/or mechanical properties and comprise at least one layer comprising a polymer material integrated with a modified clay wherein the modified clay is between about 0.5% to about 10% by weight of the nanocomposite layer.

The clay minerals may be selected from the group consisting of smectite, vermiculite and halloysite. A preferred group is smectite clay wherein smectite may be selected from montmorillonite, saponite, beidellite, nontronite, hectorite and mixtures thereof. Particularly preferred smectite clay for use in film structures is montmorillonite. The clay is usually present in a sodium ion exchange form. The clay may also be treated with an intercalant which assists in the integration of the clay mineral with the polymer material. Procedures for intercalating the clay mineral and forming the nanocomposites have been described earlier.

One source for the clay mineral is Southern Clay Products, Inc., of Gonzales, Tex. which markets the clay mineral under the product name "Cloisite" which are particular formulations of the clay mineral and other minor components. Another source for the clay mineral is Nanocor, Inc. of Carmel, Ind., which markets the clay under the product name "Nanomer". However, those skilled in the art will recognize that many sources of the clay mineral are available and those sources may have their own particular formulations which are not outside the scope of the present invention.

The film structures may consist of one or more polymeric layers wherein one or more of these layers may comprise a polymeric material integrated with nanosize particles of a modified clay mineral between about 0.5% to about 10% weight of the layer. The nanosize particles of clay have a thickness of between about 3 Å and about 50 Å, and an aspect ratio of between about 50 and about 1,000.

Polymers suitable for use in the nanocomposites of the present invention are exemplified, but not limited to, polyolefins such as low density polyethylene (LDPE), linear low density polyethylene (LLDPE), medium density polyethylene (MDPE), high density polyethylene (HDPE), and polypropylene (PP), polyamides such as poly(m-xyleneadipamide) (MXD6), poly(hexamethylenesebacamide), poly(hexamethyleneadipamide) and poly(-caprolactam), polyesters such as poly(ethylene terephthalate), and polyacrylonitriles. Other polymers suitable for use in the nanocomposites of the invention include ethylene vinyl alcohol copolymers, ethylene vinyl acetate copolymers, polyesters grafted with maleic anhydride, PVdC, aliphatic polyketone, and LCP (liquid crystalline polymers). A polyketone is exemplified by Carillon® which is produced by Shell. A liquid crystalline polymer is exemplified by Vectra® which is produced by Ticona. Further polymers that may be used include epoxy and polyurethane adhesives.

While certain clay minerals have been exemplified above it is understood that any clay mineral (both natural and synthesized) having a cation-exchange capacity of 50 to 200 milliequivalent/100 g and a large contact area with the polymer to be used in said nanocomposite are useful in the present invention.

Film structures of the present invention may be produced by methods which are known in the art. These methods can be exemplified, but not limited to coextrusion, extrusion, extrusion coating, extrusion lamination, adhesive lamination and the like, and any combination of the above-described methods. Nanocomposite materials may also be produced via extrusion coating and lamination techniques. Various application methods such as roll coating, slot die coating, rotogravure coating, and flexographic coating may be used to produce nanocomposite adhesives and coatings. The film structures of the present invention may also be oriented and/or cross-linked. The orientation of the film may be accomplished at any state of the process (i.e., the total film structure may be oriented or an individual layer or layers may be oriented prior to their inclusion in the total film structure).

The film structures of the present invention wherein one or more layers comprise a polymer material integrated with a modified clay have many applications in the packaging industry. These applications can be exemplified but not limited to drug packaging, inner liners for crackers and cereal, packaging for meats and cheese, boil-in bags, heat shrinkable films, heat shrinkable bags, dry foods, pouches, and thermoformed packages.

The nanocomposite layer or layers of the film structures of the present invention may comprise any layer or layers of the film structure such as the core layers, barrier layer, the sealant layer and the abuse layer. Also, the nanocomposite layer or layers may also comprise an adhesive layer or layers of the film structure. The nanocomposite layer may also comprise a coating which is applied to a film structure.

In order to evaluate the barrier and/or mechanical properties of the film structures of the present invention the following tests can be employed.

ASTM F1249 is a test for determining the rate of water vapor transmission through flexible barrier materials. The water vapor transmission rate is defined as the time rate of water vapor flow normal to the surfaces, under steady-state conditions, per unit area.

ASTM D3985 is a test method which covers a procedure for determination of the steady-state rate of transmission of oxygen gas through plastic films. The oxygen transmission rate is defined as the quantity of oxygen gas passing through a unit area of the parallel surfaces of a plastic film per unit time under the conditions of the D3985 test method.

ASTM D638 is a test method which covers the determination of the tensile properties of unreinforced and reinforced plastics in the form of dumb-bell shaped test specimens when tested under defined conditions of pretreatment, temperature, humidity, and testing machine speed. In general, this test measures the uniaxial strain (elongation) of the sample as a function of applied stress.

ASTM D790 is a test method which covers the determination of the flexural properties of unreinforced and reinforced plastics, from samples generally in the form of rectangular bars molded directly or cut from sheet or plate stock. In general, this test measures the stiffness, or the resistance of a material to bending.

ASTM D648 is a test method which covers the determination of the temperature at which an arbitrary deformation occurs when specimens are subjected to a particular set of testing conditions. This test provides a measure of the temperature stability of a material, i.e., the temperature below which the material does not readily deform under a standard load conditions.

Preferred embodiments of film structures having improved barrier or mechanical properties of the present invention are presented in the following examples, which are presented for illustrative purposes only and are not intended to limit the invention in any manner.

EXAMPLE 1

By coextrusion, a five layer thermoplastic nanocomposite film structure having improved gas barrier properties was produced comprising a first layer of EVA and an antiblock agent (EVA LD-302.56 from Exxon; antiblock 10710 from Ampacet); a second layer of EVA grafted maleic anhydride (Plexar 108 from Equistar); a third layer of 95 wt. % MXD6 (MXD6-6007 from Mitsubishi) and 5 wt. % of a modified clay (Cloisite from Southern Clay Products, Inc.); a fourth layer of EVA grafted maleic anhydride (Plexar 108 from Equistar); and a fifth layer of EVA (LD-302.56 from Exxon). The modified clay mineral (montmorillonite) was mixed with the MXD6 by a twin screw extrusion process. Another modified clay mineral that was used in this Example was obtained from Nanocor, Inc., under the product name Nanomer. The film structure of Example 1 has the following specification.

|  | Resin | Film Density (g/cc) | % of Layer | % of Web | Layer Density (g/cc) | Resin Wt % of Web | Layer Wt % of Web | Resin Weight (lbs/rm) | Layer Weight (lbs/rm) | Layer Caliper (mil) |
|---|---|---|---|---|---|---|---|---|---|---|
| Layer 1 inside | LD-302.56 10710 | 0.926 0.926 Total | 96.00 4.00 100.00 | 30.0 | 0.9270 | 27.95 1.16 | 29.12 | 7.92 0.33 | 8.25 | 0.57 |
| Layer 2 | Plexar 108 | 0.932 Total | 100.00 100.00 | 10.0 | 0.9320 | 9.76 | 9.76 | 2.76 | 2.76 | 0.19 |
| Layer 3 | MXD6 nanocomposite | 1.198 Total | 100.00 100.00 | 10.0 | 1.1979 | 12.54 | 12.54 | 3.55 | 3.55 | 0.19 |
| Layer 4 | Plexar 108 | 0.932 Total | 100.00 100.00 | 10.0 | 0.9320 | 9.76 | 9.76 | 2.76 | 2.76 | 0.19 |
| Layer 5 outside | LD-302.56 | 0.927 | 100.00 | 40.0 | 0.9270 | 38.82 | 38.82 | 11.00 | 11.00 | 0.76 |
|  |  |  |  |  |  |  | Total Basis Weight Total Caliper |  | 37.26 | 1.90 |

EXAMPLE 2

By coextrusion, a five layer thermoplastic nanocomposite film structure having improved gas barrier properties was produced comprising a first layer of EVA and an antiblock agent (EVA LD-302.56 from Exxon; antiblock 10710 from Ampacet); a second layer of EVA grafted maleic anhydride (Plexar 108 from Equistar); a third layer of 80 wt. % of a nanocomposite made of 95 wt. % MXD6 (MXD6-6007 from Mitsubishi) and 5 wt. % of a modified clay (Cloisite from Southern Clay Products, Inc.) and 20 wt. % of Nylon 6 (B135TP from Honeywell); a fourth layer of EVA grafted maleic anhydride (Plexar 108 from Equistar); and a fifth layer of EVA (LD-302.56 from Exxon). The modified clay mineral (montmorillonite) was mixed with the MXD6 by a twin screw extrusion process. Another modified clay mineral that was used in this Example was obtained from Nanocor, Inc., under the product name Nanomer. The film structure of Example 2 has the following specification.

EXAMPLE 3

By coextrusion, a five layer thermoplastic nanocomposite film structure having improved gas barrier properties was produced comprising a first layer of EVA and an antiblock agent (EVA LD-302.56 from Exxon; antiblock 10710 from Ampacet); a second layer of EVA grafted maleic anhydride (Plexar 108 from Equistar); a third layer of 50 wt. % of a nanocomposite made of 95 wt. % MXD6 (D6-6007 from Mitsubishi) and 5 wt. % of a modified clay (Cloisite from Southern Clay Products, Inc.) and 50 wt. % of Nylon 6 (B135TP from Honeywell); a fourth layer of EVA grafted maleic anhydride (Plexar 108 from Equistar): and a fifth layer of EVA (LD-302.56 from Exxon). The modified clay mineral (montmorillonite) was mixed with the MXD6 by a twin screw extrusion process. Another modified clay mineral that was used in this Example was obtained from Nanocor, Inc., under the product name Nanomer. The film structure of Example 3 has the following specification.

|  | Resin | Film Density (g/cc) | % of Layer | % of Web | Layer Density (g/cc) | Resin Wt % of Web | Layer Wt % of Web | Resin Weight (lbs/rm) | Layer Weight (lbs/rm) | Layer Caliper (mil) |
|---|---|---|---|---|---|---|---|---|---|---|
| Layer 1 inside | LD-302.56 10710 | 0.927 0.926 Total | 96.00 4.00 100.00 | 30.0 | 0.9270 | 28.01 1.17 | 29.18 | 7.92 0.33 | 8.25 | 0.57 |
| Layer 2 | Plexar 108 | 0.932 Total | 100.00 100.00 | 10.0 | 0.9320 | 9.78 | 9.78 | 2.76 | 2.76 | 0.19 |
| Layer 3 | MXD6 nanocomposite B135TP | 1.198 1.097 Total | 80.00 20.00 100.00 | 10.0 | 1.1777 | 9.89 1.96 | 11.84 | 2.84 0.65 | 3.49 | 0.19 |
| Layer 4 | Plexar 108 | 0.932 Total | 100.00 100.00 | 10.0 | 0.9320 | 9.78 | 9.78 | 2.76 | 2.76 | 0.19 |
| Layer 5 outside | LD-302.56 | 0.927 | 100.00 | 40.0 | 0.9270 | 38.91 | 38.91 | 11.00 | 11.00 | 0.76 |
|  |  |  |  |  |  |  | Total Basis Weight Total Caliper |  | 28.26 | 1.90 |

|  | Resin | Film Density (g/cc) | % of Layer | % of Web | Layer Density (g/cc) | Resin Wt % of Web | Layer Wt % of Web | Resin Weight (lbs/rm) | Layer Weight (lbs/rm) | Layer Caliper (mil) |
|---|---|---|---|---|---|---|---|---|---|---|
| Layer 1 inside | LD-302.56 10710 | 0.927 0.926 Total | 96.00 4.00 100.00 | 30.0 | 0.9270 | 28.10 1.17 | 29.27 | 7.92 0.33 | 8.25 | 0.57 |
| Layer 2 | Plexar 108 | 0.932 Total | 100.00 100.00 | 10.0 | 0.9320 | 9.81 | 9.81 | 2.76 | 2.76 | 0.19 |
| Layer 3 | MXD6 nanocomposite D135TP | 1.198 1.097 Total | 50.00 50.00 100.00 | 10.0 | 1.1475 | 6.04 4.91 | 10.94 | 1.78 1.63 | 3.40 | 0.19 |
| Layer 4 | Plexar 108 | 0.932 Total | 100.00 100.00 | 10.0 | 0.9320 | 9.81 | 9.81 | 2.76 | 2.76 | 0.19 |
| Layer 5 outside | LD-302.56 | 0.927 | 100.00 | 40.0 | 0.9270 | 39.03 | 39.03 | 11.00 | 11.00 | 0.76 |
|  |  |  |  |  |  | Total Basis Weight | | | 28.17 | |
|  |  |  |  |  |  | Total Caliper | | | | 1.90 |

EXAMPLE 4

By extrusion, a monolayer thermoplastic nanocomposite film structure having improved moisture barrier is produced comprising (poly)acrylonitrile and a modified clay mineral. The clay mineral is montmorillonite obtained from Southern Clay Products, Inc., under the product name Cloisite or from Nanocor, Inc., under the product name Nanomer. The modified clay mineral is 5% by weight of the film composition. In this Example and in Examples 5–18, the modified clay is mixed with the matrix polymer by twin screw extrusion compounding.

EXAMPLE 5

By coextrusion, a three layer thermoplastic nanocomposite film structure having improved heat resistance and cuttability is produced comprising the first sealant layer of Example 1; a second layer of polypropylene, regrind of the entire film, and a modified clay; and a third layer of polypropylene and a modified clay. The modified clay is 2% by weight of each of the nanocomposite layers. The modified clay mineral is montmorillonite obtained from Southern Clay Products, Inc., under the product name Cloisite or from Nanocor, Inc., under the product name Nanomer.

EXAMPLE 6

By coextrusion, a five layer thermoplastic nanocomposite film structure having improved gas and flavor barrier is produced comprising a first layer of HDPE; a second tie layer of Plexar 108; a third layer of MXD6 and a modified clay (montmorillonite from Southern Clay Products, Inc., under the product name Cloisite or from Nanocor, Inc., under the product name Nanomer); a fourth tie layer of Plexar 108; and a fifth sealant layer of EVA. The modified clay is 5% by weight of the nanocomposite layer.

EXAMPLE 7

Following the procedure of Example 6, a thermoplastic film structure is produced wherein the modified clay is present in the HDPE layer of said film structure. The modified clay is 5% by weight of the nanocomposite layer.

EXAMPLE 8

Following the procedure of Example 6, a thermoplastic film structure is produced wherein the modified clay is present in both the HDPE layer and the MXD6 layer. The modified clay is 5% by weight of each nanocomposite layer.

EXAMPLE 9

By coextrusion, a five layer thermoplastic nanocomposite film structure having improved moisture and flavor barrier is produced comprising a first layer of HDPE; a second tie layer of Plexar 108; a third layer of EVOH and a modified clay (montmorillonite obtained from Southern Clay Products, Inc., under the product name Cloisite or from Nanocor, Inc., under the product name Nanomer); a fourth tie layer of Plexar 108; and a fifth sealant layer of EVA. Alternatively, the modified clay is provided in the HDPE layer of the five layer film, either in addition to or to the exclusion of the modified clay in the EVOH layer. The modified clay is 5% by weight of each nanocomposite layer.

EXAMPLE 10

By coextrusion, a three layer thermoplastic nanocomposite film structure having improved moisture and flavor barrier is produced comprising a first layer of HDPE and a modified clay (montmorillonite obtained from Southern Clay Products, Inc., under the product name Cloisite or from Nanocor, Inc., under the product name Nanomer); a second layer of HDPE plus trim; and a third sealant layer of EVA. The modified clay is 5% by weight of the nanocomposite layer.

EXAMPLE 11

By coextrusion, a three layer thermoplastic nanocomposite film structure having improved heat resistance and gas barrier is produced comprising a first layer of MXD6 and a modified clay (montmorillonite obtained from Southern Clay Products, Inc., under the product name Cloisite or from Nanocor, Inc., under the product name Nanomer); a second tie layer of Plexar 108; and a third sealant layer of EVA. The modified clay is 10% by weight of the nanocomposite layer.

EXAMPLE 12

By coextrusion, a four layer thermoplastic nanocomposite film structure having improved heat resistance and gas barrier is produced comprising a first layer of MXD6; a second layer of EVOH and a modified clay (montmorillonite obtained from Southern Clay Products, Inc., under the product name Cloisite or from Nanocor, Inc., under the product name Nanomer); a third tie layer of Plexar 108; and a fourth sealant layer of EVA. Alternatively, the modified clay is provided in the MXD6 layer of the four layer film, either in addition to or to the exclusion of the modified clay in the EVOH layer. The modified clay is 5% by weight of each nanocomposite layer.

EXAMPLE 13

By coextrusion, a five layer thermoplastic nanocomposite film structure having improved heat resistance and gas barrier is produced comprising a first layer of MXD6; a second tie layer of Plexar 108; a third layer of EVOH and a modified clay (montmorillonite obtained from Southern Clay Products, Inc., under the product name Cloisite or from Nanocor, Inc., under the product name Nanomer); a fourth tie layer of Plexar 108; and a fifth sealant layer of EVA. Alternatively, the modified clay is provided in the MXD6 layer of the five layer film, either in addition to or to the exclusion of the modified clay in the EVOH layer. The modified clay mineral is 10% by weight of each nanocomposite layer.

EXAMPLE 14

By coextrusion, a seven layer thermoplastic nanocomposite film structure having improved heat resistance and gas barrier is produced comprising a first layer of MXD6; a second tie layer of Plexar 108; a third interior layer of MXD6 and a modified clay (montmorillonite obtained from Southern Clay Products, Inc., under the product name Cloisite or from Nanocor, Inc., under the product name Nanomer); a fourth core layer of MXD6; a fifth interior layer of MXD6; a sixth tie layer of Plexar 108 and a seventh sealant layer of EVA. Alternatively, the modified clay is provided in any or all of the MXD6 layers of the seven layer film structure. The modified clay is 5% by weight of each nanocomposite layer.

EXAMPLE 15

A seven layer thermoplastic nanocomposite film structure is produced according to Example 14, except that the fourth core layer is substituted with EVOH and a modified clay. Alternatively, the core layer of EVOH and a modified clay is either in addition to or to the exclusion of the modified clay in any or all of the MXD6 layers of the seven layer film structure. The modified clay is 5% by weight of each nanocomposite layer.

EXAMPLE 16

By coextrusion, a five layer thermoplastic nanocomposite film structure having improved gas barrier is produced comprising a first layer of LDPE; a second tie layer of Plexar 108; a third layer of EVOH and a modified clay (montmorillonite obtained from Southern Clay Products, Inc., under the product name Cloisite or from Nanocor, Inc., under the product name Nanomer); a fourth tie layer of Plexar 108; and a fifth sealant layer of EVA. The modified clay is 5% by weight of the nanocomposite layer.

EXAMPLE 17

A six layer thermoplastic nanocomposite film structure having improved heat resistance and gas barrier is produced according to Example 15, by eliminating the nylon layer between the EVOH and the tie/sealant layers. As in Example 15, the six layer film has at least one layer of nylon and a modified clay and/or one layer of EVOH and a modified clay. The modified clay is 5% by weight of each nanocomposite layer.

EXAMPLE 18

By extrusion, a monolayer thermoplastic nanocomposite film structure having improved stiffness, heat resistance and moisture barrier is produced comprising a layer of polypropylene and a modified clay (montmorillonite obtained from Southern Clay Products, Inc., under the product name Cloisite or from Nanocor, Inc., under the product name Nanomer). The modified clay is 5% by weight of the nanocomposite layer.

EXAMPLE 19

By lamination, a four layer thermoplastic laminate nanocomposite film structure is produced comprising a first film of biaxially oriented PET; a second layer of ink; a third adhesive layer of polyurethane and a modified clay (montmorillonite obtained from Southern Clay Products, Inc., under the product name Cloisite or from Nanocor, Inc., under the product name Nanomer); and a fourth sealant film of LDPE. Alternatively, the fourth sealant film is a single or multilayer film of LLDPE, LDPE, EVA or blend thereof. The modified clay is 2.5% by weight of the nanocomposite layer.

EXAMPLE 20

By lamination, a four layer thermoplastic laminate nanocomposite film structure is produced comprising a first film of oriented polypropylene (OPP); a second layer of ink; a third adhesive layer of polyurethane and a modified clay (montmorillonite obtained from Southern Clay Products, Inc., under the product name Cloisite or from Nanocor, Inc., under the product name Nanomer); and a fourth sealant film of LDPE. Alternatively, the fourth sealant film is a single or multilayer film of LLDPE, LDPE, EVA or blend thereof. The modified clay is 0.5% by weight of the nanocomposite layer.

EXAMPLE 21

By lamination, a four layer thermoplastic laminate nanocomposite film structure is produced comprising a first film of biaxially oriented Nylon 6; a second layer of ink; a third adhesive layer of epoxy and a modified clay (montmorillonite obtained from Southern Clay Products, Inc., under the product name Cloisite or from Nanocor, Inc., under the product name Nanomer); and a fourth sealant film of LDPE. Alternatively, the fourth sealant film is a single or multilayer film of LLDPE, LDPE, EVA or blend thereof. The modified clay is 5% by weight of the nanocomposite layer.

EXAMPLE 22

Nanocomposites of the present invention may also be present in coatings which are applied to a film structure. Examples of coating materials and methods of application are given below.

Coating—UV Cure

Coating—UV cure epoxy:—V113-114G UV Barrier Varnish from PPG Industries, Inc.

Substrate:—corona treated PET film.

Method:—Nanomer from Nanocor is incorporated into UV cure epoxy at 2.5% by weight. Mixed via high shear blender. Coating applied to PET by wire-wound rod and subsequently cured using a UV source.

Result:—15% improvement in oxygen barrier with no loss of transparency when applied to the PET film.

Coating—Vinyl Lacquer

Coating—vinyl lacquer:—mixture of acid-modified vinyl chloride-vinyl acetate copolymer resin with a vinyl solution and a plasticizer.

Substrate:—foil.

Method:—Cloisite from Southern Clay Products is incorporated into vinyl lacquer and a solution of methyl ethyl ketone (MEK) at 2% by weight loading relative to the dry lacquer. Mixed via high shear blender. Coating applied with wire-wound rod and subsequently dried.

We claim:

1. A thermoplastic film comprising a barrier layer, selected from the group consisting of oxygen, gas, flavor, and aroma barriers, the barrier layer comprising a polymeric nanocomposite wherein said polymeric nanocomposite comprises a polymer wherein said polymer is selected from the group consisting of polyacrylonitrile copolymer, polyamides, ethylene vinyl alcohol copolymers, ethylene vinyl acetate copolymers, polyesters grafted with maleic anhydride, PVdC, aliphatic polyketones and liquid crystalline polymers, and nanosize particles of a modified clay.

2. The thermoplastic film of claim 1 wherein the barrier layer comprises a surface layer of said thermoplastic film.

3. The thermoplastic film of claim 1 wherein the barrier layer comprises an interior layer of said film.

4. The thermoplastic film of claim 1 wherein the polymer comprises a polyacrylonitrile copolymer.

5. The thermoplastic film of claim 1 wherein the polymer comprises a polyamide.

6. The thermoplastic film of claim 5 wherein the polyamide is selected from the group consisting of Nylon-6,10, Nylon 6,6, Nylon-6, MXD6, and Nylon 6/6,6.

7. The thermoplastic film of claim 1 wherein the polymer comprises ethylene vinyl alcohol copolymer.

8. The thermoplastic film of claim 1 wherein the clay mineral comprises a phyllosilicate.

9. The thermoplastic film of claim 8 wherein the phyllosilicate comprises montmorillonite.

10. A thermoplastic film comprising a moisture barrier layer, the moisture barrier layer comprising a polymeric nanocomposite wherein said polymeric nanocomposite comprises a polymer wherein said polymer is selected from the group consisting of polyacrylonitrile copolymer, polyamides, ethylene vinyl alcohol copolymers, ethylene vinyl acetate copolymers, polyesters grafted with maleic anhydride, PVdC, aliphatic polyketones and liquid crystalline polymers, and nanosize particles of a modified clay.

11. A thermoplastic laminate film comprising at least one adhesive layer, the adhesive layer comprising a polymeric nanocomposite comprising a polymer and nanosize particles of a modified clay.

12. The thermoplastic laminate film of claim 11 wherein the polymer is selected from the group consisting of polyurethane and epoxy based adhesives.

13. A thermoplastic film comprising a coating layer on the surface layer of said film, the coating layer comprising a polymeric nanocomposite comprising a polymer wherein said polymer is selected from the group consisting of polyacrylonitrile copolymer, polyamides, ethylene vinyl alcohol copolymers, ethylene vinyl acetate copolymers, polyesters grafted with maleic anhydride, PVdC, aliphatic polyketones and liquid crystalline polymers, and nanosize particles of a modified clay.

* * * * *